(12) United States Patent
Baldassare

(10) Patent No.: US 7,683,502 B2
(45) Date of Patent: Mar. 23, 2010

(54) AUTOMATED MOBILE POWER SYSTEM

(76) Inventor: Fred Baldassare, 203 Les Peupliers, Laval, Quebec (CA) H7R 1G7

( * ) Notice: Subject to any disclaimer, the term of this patent is extended or adjusted under 35 U.S.C. 154(b) by 260 days.

(21) Appl. No.: 12/070,045

(22) Filed: Feb. 14, 2008

(65) Prior Publication Data
US 2009/0206612 A1    Aug. 20, 2009

(51) Int. Cl.
*B60L 1/00*    (2006.01)
(52) U.S. Cl. .................................. 307/9.1
(58) Field of Classification Search ............ 307/9.1
See application file for complete search history.

(56) References Cited

U.S. PATENT DOCUMENTS

| | | | |
|---|---|---|---|
| 2,733,661 A | 2/1956 | Surgi | |
| 4,133,572 A | 1/1979 | Robbins et al. | |
| 5,013,055 A | 5/1991 | Labrum | |
| 5,066,866 A * | 11/1991 | Hallidy | 290/1 R |
| 5,678,982 A | 10/1997 | Schwaiger | |
| 5,732,764 A | 3/1998 | Douglas et al. | |
| 6,065,942 A | 5/2000 | Glidden et al. | |
| 6,571,949 B2 | 6/2003 | Burrus, IV et al. | |
| 6,596,941 B2 | 7/2003 | Tripoli | |
| 7,119,450 B2 * | 10/2006 | Albrecht | 290/1 A |
| 7,182,147 B2 | 2/2007 | Cutler et al. | |

* cited by examiner

*Primary Examiner*—Robert L. DeBeradinis
(74) *Attorney, Agent, or Firm*—Gene Scott; Patent Law & Venture Group

(57) ABSTRACT

An automated mobile power system is capable of storing energy in electrical, hydraulic and pneumatic subsystems for driving a range of interchangeable tools. The system charges three storage means: electrical batteries for providing electrical energy, a hydraulic accumulator for providing hydraulic energy, and an air accumulator for providing pneumatic energy. A small diesel engine provides power to recharge each subsystem as needed. Between recharging cycles, the engine is shut down. A controller unit enables use of the apparatus in one of an automatic mode, which starts and stops the engine automatically based on a plurality of sensors that detect when a recharge is necessary, or a manual mode. The apparatus may also provide a heating unit capable of heating the work area. Preferably the apparatus is either mounted into a standard pick-up truck, service body, or flat-bed vehicle, or contained in a compact housing for easy transport.

9 Claims, 2 Drawing Sheets

AUTOMATED MOBILE POWER SYSTEM

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

REFERENCE TO A "MICROFICHE APPENDIX"

Not applicable.

SEQUENCE LISTING

Not applicable.

BACKGROUND OF THE INVENTION

1. Field of the Present Disclosure

This disclosure relates generally to mobile power systems, and more particularly to an automated mobile power system capable of storing energy in electrical, hydraulic and pneumatic subsystems for driving a wide range of interchangeable tools and in particular saving energy by shutting down a recharging engine when not needed for recharging.

2. Description of Related Art Including Information Disclosed Under 37 CFR 1.97 and 1.98

Surgi, U.S. Pat. No. 2,733,661, discloses a wheel supported platform and an engine base supported from said platform and spaced thereabove, an internal combustion engine mounted on said base, a generator including a casing on said internal casing engine and having a generator tail shaft extending rearwardly from the casing above the platform, a second shaft in alignment with said generator tail shaft, a pump supported on said platform and having a driving shaft extending forwardly beneath the first mentioned shaft, belt pulleys mounted on said second shaft and said driving shaft, a belt connecting said belt pulleys, an electric clutch connecting said generator tail shaft and said second shaft, said clutch being provided with a circuit connection to said generator and a frame extending from the pump forwardly toward the generator and supporting said driving shaft.

Robbins et al., U.S. Pat. No. 4,133,572, discloses a utility trailer having folding and retractable sides and end panels, tool and equipment storage bins, and a power winch, and further characterized by power operated tools and equipment which may be driven by a power take-off unit on the towing vehicle or an optional auxiliary engine. In a preferred embodiment, the utility trailer is mounted on a conventional style chassis and includes a set of brackets for mounting gin poles to facilitate lifting of equipment and supplies.

Labrum, U.S. Pat. No. 5,013,055, discloses a small, mobile, tool caddy, characterized by having an on-board generator so that the power tools carried in the caddy can be operated anywhere. The caddy comprises a wheeled frame with some type of superstructure which will hold the power tools and hand tools needed in a particular profession, with the preferred or illustrated embodiment being a utility box mounted in the frame. The utility box has tool mounting brackets on its sides, front, and top, and also mounts a collapsible cloth refuse bag just behind the utility box.

Schwaiger, U.S. Pat. No. 5,678,982, discloses a mobile hydraulic system with a hydraulic pump, which is powered by a battery powered motor and fed from a hydraulic reservoir, whereby the pump, the battery, the motor and the hydraulic reservoir are a compact, portable hydraulic unit, to which a working tool, which is separated from the portable hydraulic unit and is exchangeable, can be connected via a hydraulic connecting line of the hydraulic pump.

Douglas et al., U.S. Pat. No. 5,732,764, discloses a heater for heating an enclosure associated with a motor vehicle having a liquid coolant system for storage of materials that may damaged by freezing temperatures, such as a truck utility box. The heater comprises an enclosure with an aperture in communication with the enclosure, a heat exchange means for transferring heat from coolant from the cooling system of the vehicle flowing through the heat exchange means to the air flowing adjacent to the heat exchange means, and an electrical blower means for forcing air through the heat exchange means and out of the enclosure into the enclosure through the aperture. The blower means has an electrical control means for controlling its function by a driver of the vehicle.

Glidden et al., U.S. Pat. No. 6,065,942, discloses a utility package for installation in the bed of a pickup truck that includes a frame having a relatively narrow, lower vertical section of a width narrower than the interior spacing between the sides of the pickup truck bed while substantially spanning the entire interior distance between such sides and a relatively wide, upper horizontal section of a width greater than the interior spacing between the sides and no greater than about the distance between the exteriors of the sides and adapted to be supported on the tops of the sides. An elongated pressure vessel is located within the vertical section and a pair of upright housing sections are mounted on the horizontal section oppositely of the vertical section. The housing section have access openings at respective ends of the horizontal section. An air compressor unit is mounted on the frame between the housing section and a tool box is located in the vertical section adjacent to one end and above the pressure vessel to be accessible through the housing section. At least one hose reel is mounted in the vertical section adjacent to the other end of the horizontal section and is accessible through the housing section at the end of the horizontal section.

Burrus IV et al., U.S. Pat. No. 6,571,949, discloses a power toolbox for vehicles that charges power tools and batteries while the vehicle is driven. A preferred embodiment is intended to be placed in a pick-up truck bed. The toolbox is coupled to the vehicular automotive system, and electrical power is delivered through electrical contacts in the toolbox to modular compartments that hold power tools or batteries in a nested fashion. When the vehicle is running, any battery or tool coupled to a compartment is charged. The compartments may be of different shapes and sizes and may include electrical circuitry to modulate the voltage and current from the vehicular electrical system. An optional manual switch is provided to disengage the toolbox from the vehicular electrical system.

Tripoli, U.S. Pat. No. 6,596,941, discloses an AC electrical power delivery system for installation into a utility box attached to the bed of a pickup truck. This system delivers AC electrical power for operating light-duty equipment including power hand tools and electrical equipment to an included AC outlet connectable to a side wall of the utility box. An electrical power inverter is provided of the type which converts incoming DC electrical power to AC electrical power. The inverter is installable into the utility box in proximity to, and having an AC power output in electrical communication with, the AC outlet. This system may also include a separate DC electrical power storage battery or utilize the battery of the pickup truck. A wiring harness is connectable at one end thereof to a DC input of the inverter and extendable along the body of the pickup truck and connectable at another end of the wiring harness to the DC storage battery whereby DC electrical power is transferred by the wiring harness from the storage batter to the inverter when AC electrical power is demanded at the AC outlet.

Cutler et al., U.S. Pat. No. 7,182,147, discloses a system, and a method of using a system, for controlled tool operation. The method includes providing a tool used in a force application such as a such torque application. The tool communicates with a controller which can communicate with the tool, and to a display in communication with the tool and the controller. The controller can be programmed with operational information about a tool operation. Information related to the operational information is displayed to a user during use. Service information including at least information about an amount of force applied during use is recorded and stored in the controller. Also disclosed is a computerized system for controlled tool operation which sends operational instructions to the tool before use and retrieves service information from the tool after use.

The related art described above discloses power units capable of powering electrical, hydraulic, and pneumatic devices. In addition, the related art discloses such power units that are capable of being installed in a utility truck, as well as units that have a dedicated engine separate from that of the utility truck. However, the prior art fails to disclose an integrated apparatus that provides electrical, hydraulic, and pneumatic power sources configured for operating tools within the truck and nearby the truck. The present invention discloses details of such an integrated apparatus having a dedicated engine and capable of either being installed in a utility vehicle or self-contained in a compact housing that, itself, may be carried by a utility vehicle, as for instance, in the bed of a truck. The present apparatus stores energy, monitors energy resources and replenishes the stored energy automatically.

BRIEF SUMMARY OF THE INVENTION

This disclosure teaches certain benefits in construction and use which give rise to the objectives described below.

The use of electric, pneumatic, and hydraulic tools for utility construction and repair is a well mature technical field. Such machines are commonly used in conjunction with utility vehicles where they draw power primarily from the vehicle engine. In most cases the vehicle's engine is operated nonstop during work hours on site, typically at least six hours each operating day. This is typical routine since at many times during the working shift, power is required and is readily available to workers. However, this is a wasteful practice since power is only required for limited periods of time when tools are actually being operated, and also, an engine used to operate a truck is much more powerful than typically necessary to operate work tools. The truck engine, at idle, typically uses ten to twenty times the actual horsepower required to operate worker's tools. Therefore, the energy efficiency of such practice is below five percent, with a great waste of fuel and much more truck engine maintenance necessary over time, than for simple commuter utility alone.

In a work environment, it is estimated that the amount of time a worker actually uses his pneumatic, hydraulic, or electric tools is approximately 10% to 20% of his work day. In other words, the tools are only used approximately 36 to 72 minutes per work day. Thus, if a vehicle's battery and/or engine were left running the entire work day, this would be significant waste of energy. On the other hand, turning the vehicle's engine on and off every time it is needed to deliver power to a tool is time consuming and tedious.

The present invention solves these problems by providing an automated mobile tool-driving apparatus capable of storing energy in electrical, hydraulic and pneumatic subsystems for driving a range of interchangeable tools. The system charges three storage means: electrical batteries for providing electrical energy, a hydraulic accumulator for providing hydraulic energy and an air accumulator for providing pneumatic energy. Power is provided by a small diesel engine to recharge each of these three subsystems as needed. Between recharging cycles, the engine is shut down. When any one or more of the storage means requires recharging, the engine is started up and operated until the storage means are brought up to a desired level (topped-off). The tool driving apparatus draws its power from an auxiliary battery and the truck's fuel tank or an auxiliary fuel tank; thus, the vehicle's much more massive engine is shut down at all times the truck is not in operation. A controller unit enables the apparatus in one of two modes: an automatic mode, which starts and stops the auxiliary engine automatically based on a plurality of sensors that detect when energy recharging is necessary; and a manual mode. In addition, the apparatus may provide a heating unit for climate control within a work area in the truck, or the cab of the truck. Preferably, the apparatus may be "built-in" to the truck with components of the apparatus mounted within the truck and integrated with it appropriately, or the apparatus may be contained in a compact housing, such as a steel box, allowing for relatively easy transport from one truck to another and for use with a truck only when desired. In such an embodiment, the apparatus is mounted into a standard pick-up truck, service body, or flat-bed vehicle.

A primary objective inherent in the above described apparatus and method of use is to provide advantages not taught by the prior art.

Another objective is to provide a mobile tool-driving apparatus that provides it's own power source; not requiring power from an outside source.

A further objective is to provide such an apparatus that can be installed into a standard pick-up truck, service body, or flat bed vehicle.

A still further objective is to provide such an apparatus that can be contained in a compact, relatively portable, housing.

A still further objective is to provide such an apparatus that is capable of driving electrical, pneumatic, and hydraulic tools.

A still further objective is to provide such an apparatus including a climate control unit for assuring comfort in a work area in a vehicle.

A still further objective is to provide such an apparatus that is capable of automatically recharging each one of the energy storage devices during operations to maintain a "topped-off" condition.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is a preferred embodiment of the present invention In such drawing(s):

DETAILED DESCRIPTION OF THE INVENTION

Figure 1:
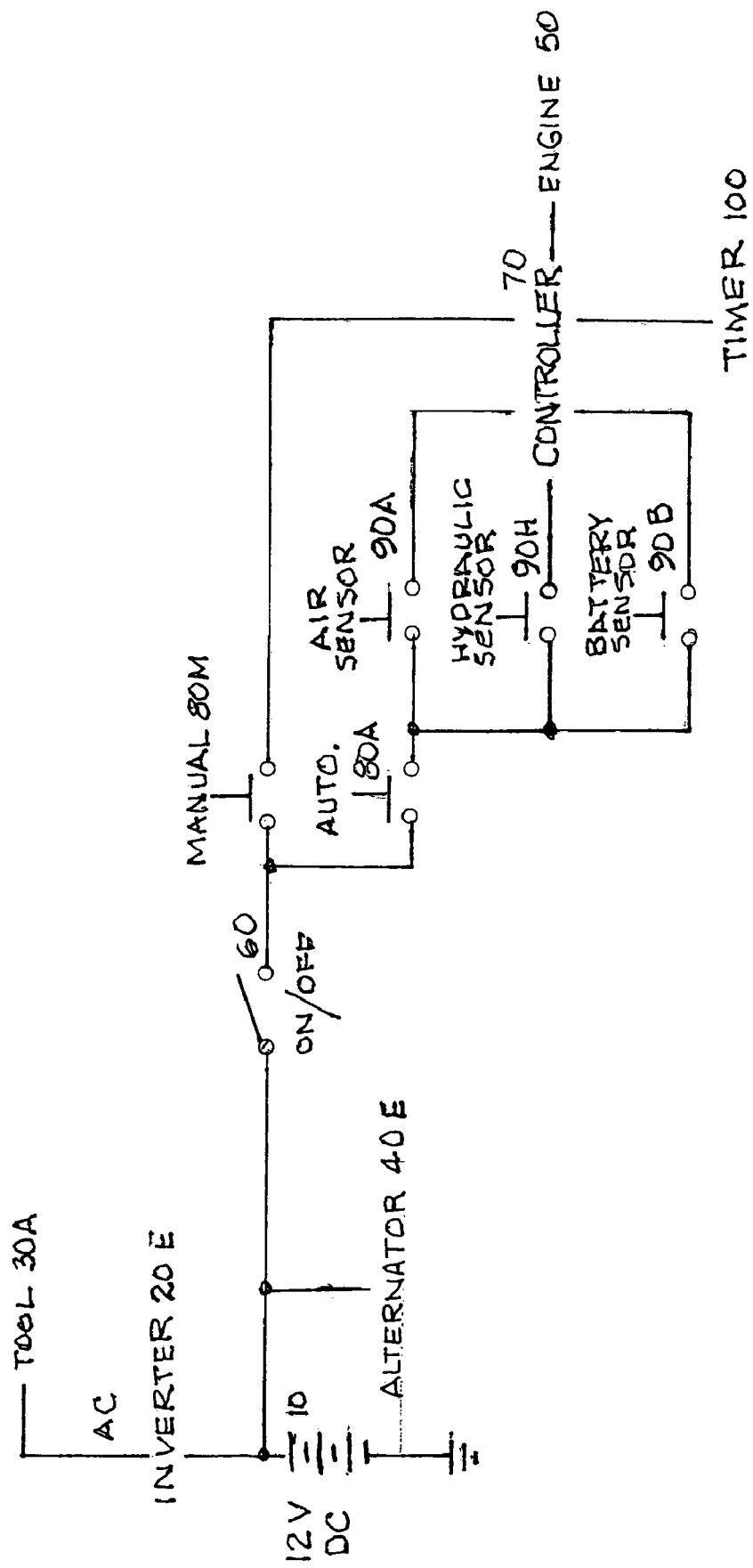
FIG. 1 is an electrical schematic diagram of the present invention.

The above described drawing figures illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

Described now in detail is a mobile tool-driving apparatus and its method of use. The schematic diagram of FIG. 1 defines the primary operating characteristics of the present invention. A 12 volt battery 10 provides current to inverter 20E which converts this DC current to 110AC current to drive an electrical tool 30A such as a drill, circular saw, or the like. An alternator 40E, driven by engine 50, maintains battery 10 at full charge in accordance with the present inventions preferred operation as described below. When on/off switch 60 is made, power from battery 10 is delivered to controller 70 through manual switch 80M directly, or alternately through automatic switch 80A if one or more of: air sensor switch 90A, hydraulic sensor switch 90H, or battery sensor switch 90B is made. Sensor switches 90A, 90H and 90B are made only when air pressure, hydraulic pressure or battery charge, respectively, falls below an operational set point selected for each of the sensors.

In manual operation, switch 80M is made and controller 70 starts-up engine 50 until switch 80M is opened, causing controller 70 to shut down engine 50. When switch 80A is made, the system is in automatic operation. In automatic operation, engine 50 is not started up unless either one or more of switches 90A, 90H or 90B is made. When this occurs engine 50 is started up. Engine 50 continues to operate as long as any one of the sensor switches is closed. When, the last of sensor switches 90A, 90H and 90B has opened because it senses that a high limit has been reached, controller 70 starts timer 100 which has a selectable time-out duration. When timer 100 times-out, if sensor switches 90A, 90H and 90B are still open, controller 70 shuts engine 50 down.

From the foregoing it should be understood that engine 50 is only operated when necessary and is shut down as long as none of sensor switches 90A, 90H and 90B calls for recharging operation. The reason for timer 100 will be described presently.

Figure 2:
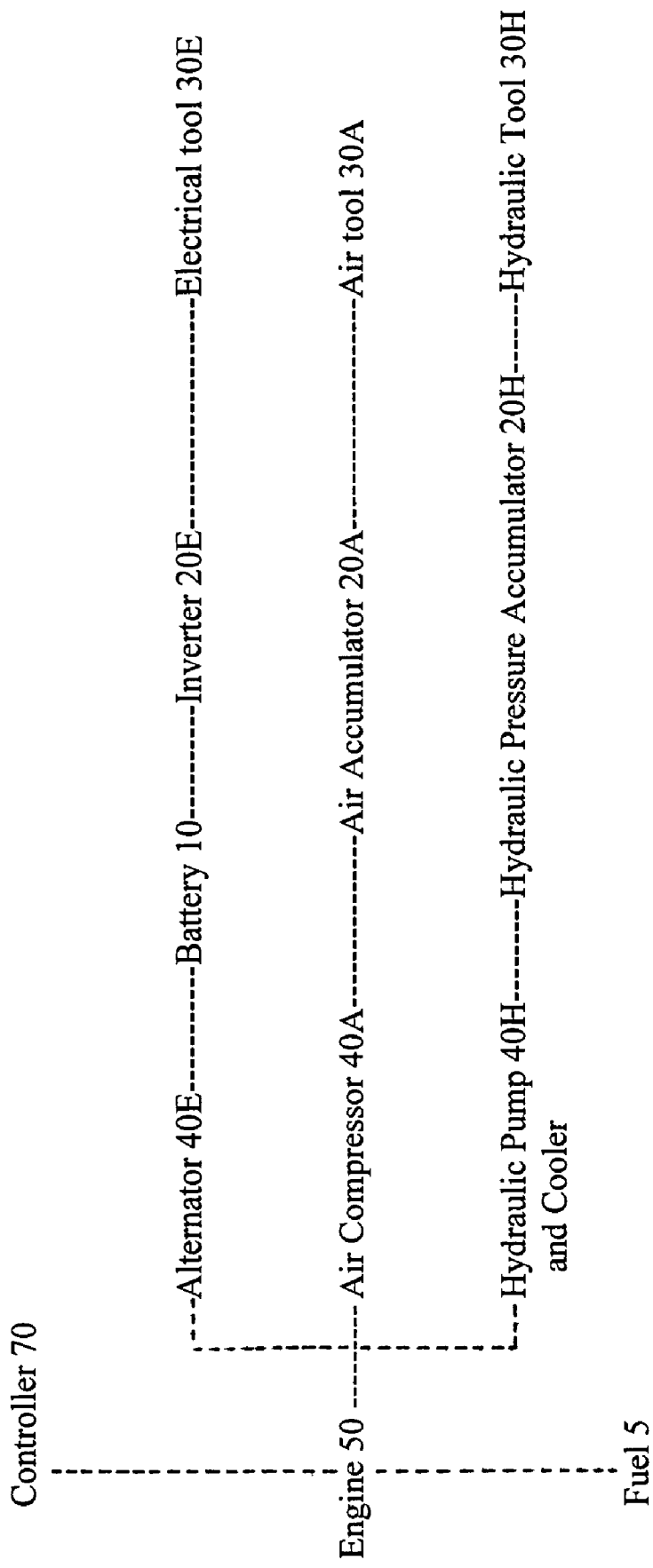
FIG. 2 is an association diagram thereof showing the interrelationship of the major components of the invention.

In the diagram of FIG. 2 we see that engine 50 is mechanically engaged with alternator 40E, air compressor 40A, and hydraulic pump and cooler 40H. When engine 50 is operating, alternator 40E, air compressor 40A and hydraulic pump and cooler 40H deliver electricity, air and hydraulic pressure, respectively, to battery 10, air accumulator 20A, and hydraulic accumulator 20H. Electrically driven tool 30E, air driven tool 30A and hydraulically driven tool 30H may be connected to delivery lines from inverter 20E, air accumulator 20A and hydraulic accumulator and cooler 20H respectively, and are operated by the energy delivered by these stored energy devices and means. As further shown in FIG. 2, we see that controller 70 is interconnected with engine 50 for controlling operation thereof in accordance and as shown in FIG. 1. FIG. 2 also shows that engine 50 is operated from fuel supply 5. Battery 10 is typically large enough to operate an electrical tool 30E for a considerable amount of time. When a team of craftsmen are all using electrical tools 30E at the same time, the energy stored in battery 10 is depleted more rapidly and will drop to the low set point of sensor switch 90B, whereby recharging is necessary, sooner. The air accumulator 20A also provides enough air pressure to operate a single air tool 30A for some time. When more than one air tool 30A is being operated at the same time, the low set point of sensor switch 90A will be reached sooner and recharging will then be called-for sooner as well. In contrast to the operation described for electrical and air tools above, hydraulic tool operation requires engine 50 to be operated whenever a hydraulic tool 30H is being used. As soon as a hydraulic tool 30H is started into operation, the low set point at hydraulic sensor switch 90H is reached and the sensor switch is closed. Therefore, it is clear that engine 50 must be operated whenever any hydraulic tool 30H is in use.

In using any tool, it will be understood that such tool may be used continuously, as for instance, a grinding wheel might be. On the other hand, many tools are used intermittently. For instance, a jack hammer typically is used for several seconds at a time, with intermittent stops. Further, a tool may be used for periods of time with rests in-between periods of use for inspecting progress, as only one example. Because of such usages, timer 100 is used to assure that engine 50 is not shut down for each and every pause in tool usage. The startup of engine 50 typically takes a few moments. Therefore, timer 100 is set to prevent immediate cutoff of engine 50 by maintaining its operation for at least a few seconds even after none of the sensor switches 90A, 90H or 90E are calling for engine operation.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. An automated mobile power system for operating tools, the system comprising:
    an electrical circuit having components including: a power source with recharger, three sensor switches arranged in electrical parallel interconnection, a system controller, an engine, and a timer;
    the power source with recharger electrically interconnected with the system controller through the three sensor switches;
    the system controller interconnected with the engine;
    the system controller enabled to start-up the engine upon condition occurring when any one of the sensor switches is made;
    the system controller enabled to start a timer cycle of the timer upon condition occurring when all of the sensor switches are not made;
    the system controller enabled to shut-down the engine upon condition occurring when all of the sensor switches are not made, and, simultaneously, the timer completes the timer cycle.

2. The automated mobile power system of claim 1 further comprising a first switch electrically interconnected between the power source with recharger and the system controller; the system controller enabled to start-up the engine upon condition occurring when the first switch is made.

3. The automated mobile power system of claim 2 further comprising a second switch wherein the first and the second switches are operable under the logical operation exclusive disjunction, the second switch interconnected between the power source with recharger and the three sensor switches.

4. The automated mobile power system of claim 1 wherein the power source is a storage battery.

5. The automated mobile power system of claim 4 wherein the recharger is an alternator mechanically operably engaged with the engine for delivering electrical energy to the storage battery.

6. The automated mobile power system of claim 4 further comprising an inverter interconnected with the storage battery, the inverter operable in driving an electrical tool.

7. The automated mobile power system of claim 1 further comprising an air compressor mechanically interconnected with the engine, the air compressor operable in pressurizing an air accumulator, the air accumulator operable in driving an air operated tool.

8. The automated mobile power system of claim 1 further comprising an hydraulic pump mechanically interconnected with the engine, the hydraulic pump operable in pressurizing a hydraulic accumulator, the hydraulic accumulator operable in driving a hydraulically operated tool.

9. The automated mobile power system of claim 1 further comprising a machine mechanically interconnected with the engine, the machine operable in pressurizing an accumulator with a fluid, the accumulator operable in driving a fluid pressure operated tool.

* * * * *